United States Patent [19]

Drew, Jr.

[11] 3,918,587
[45] Nov. 11, 1975

[54] APPARATUS FOR DETECTING AND DISPENSING ARTICLES OF PRESELECTED WEIGHTS SUSPENDED FROM SHACKLES

[75] Inventor: Bernard Drew, Jr., Gainesville, Ga.

[73] Assignee: Gainesville Machine Company, Inc., Gainesville, Ga.

[22] Filed: Nov. 16, 1973

[21] Appl. No.: 416,517

[52] U.S. Cl. .............................. 209/121; 177/210
[51] Int. Cl.² .................... B07C 5/20; B07C 5/28
[58] Field of Search .................... 209/121; 177/210; 73/141 A

[56] References Cited
UNITED STATES PATENTS

| | | | |
|---|---|---|---|
| 3,642,130 | 2/1972 | Altenpohl | 209/121 |
| 3,643,753 | 2/1972 | Godwin | 177/210 |
| 3,651,939 | 3/1972 | Harben | 209/121 |
| 3,797,595 | 3/1974 | Yin | 177/210 |

Primary Examiner—Robert B. Reeves
Assistant Examiner—Thomas E. Kocovsky
Attorney, Agent, or Firm—Newton, Hopkins & Ormsby

[57] ABSTRACT

Apparatus is disclosed for detecting and dispensing articles of preselected weights suspended from shackles being moved along a path by a conveyor line. The apparatus comprises a platform to successively support the shackles at a weighing station disposed along the path. A load cell is coupled with the platform to generate an electric signal indicative of the weight of an article carried by a shackle supported on the platform. Switching means are electrically coupled with the load cell to respond to the magnitude of signals received therefrom. A solenoid is coupled with the switching means. Trip lever means are mechanically coupled with the solenoid to release an article from the shackle being weighed on the platform upon actuation of the solenoid.

5 Claims, 5 Drawing Figures

APPARATUS FOR DETECTING AND DISPENSING ARTICLES OF PRESELECTED WEIGHTS SUSPENDED FROM SHACKLES

BACKGROUND OF THE INVENTION

This invention relates generally to apparatuses for detecting and dispensing articles of preselected weight suspended from shackles, and more particularly to apparatuses for detecting and dispensing poultry or other farm products suspended from shackles being moved along a path by a conveyor system in a processing plant.

In poultry processing plants automatic apparatus is frequently incorporated into conveyor lines to identify and dispense fowl suspended from shackles which fall within a preselected weight range. Heretofore, such automatic apparatus has typically taken the form of pivotal weight scales over which the shackles are successively brought. Movements of such scales within a pre-established range of distances actuates selected members of a set of microswitches. Actuation of the proper set of microswitches generates a signal which is fed to an electrical to mechanical transducer causing a trip arm to pivot the hock engaging portion of the shackle being weighed thereby dispensing the bird.

The prior art methods have been noticeably lacking in certain respects. For example, the just mentioned microswitches have tended to wear out rapidly thereby creating need for frequent replacement. The scale pivot points have also tended to wear excessively which wear adversely effects both the accuracy of the scale as well as creating need for frequent pivot replacement. The actual movement of the scale itself creates bounce which generates vibrations that lead to inaccuracies in such a dynamic environment as that associated with conveyor lines.

Accordingly, it is a general object of the present invention to provide improved apparatuses for detecting and dispensing articles of preselected weight suspended from shackles movable along a path by a conveyor line.

More particularly, it is an object of the present invention to provide apparatuses for detecting and dispensing articles of preselected weight suspended from shackles with a relatively high degree of functional accuracy.

Another object of the invention is to provide apparatuses for detecting and dispensing articles of preselected weight suspended from shackles which apparatuses require minimal attention and maintenance.

Yet another object of the invention is to provide apparatuses for detecting and dispensing articles of preselected weight suspended from shackles being moved in a dynamic conveyor line system which apparatuses are minimally effected by system vibrations.

SUMMARY OF THE INVENTION

The apparatus comprises a platform for successively supporting the shackles at a weighing station disposed along the path. A load cell is coupled with the platform to generate an electric signal indicative of the weight of an article carried by a shackle supported on the platform. Switching means are electrically coupled with the load cell to respond to the magnitude of signals received therefrom. A solenoid is coupled with the switching means. Trip lever means are mechanically coupled with the solenoid to release an article from the shackle being weighed on the platform upon actuation of the solenoid.

DETAILED DESCRIPTION OF THE DRAWING

Figure 1:
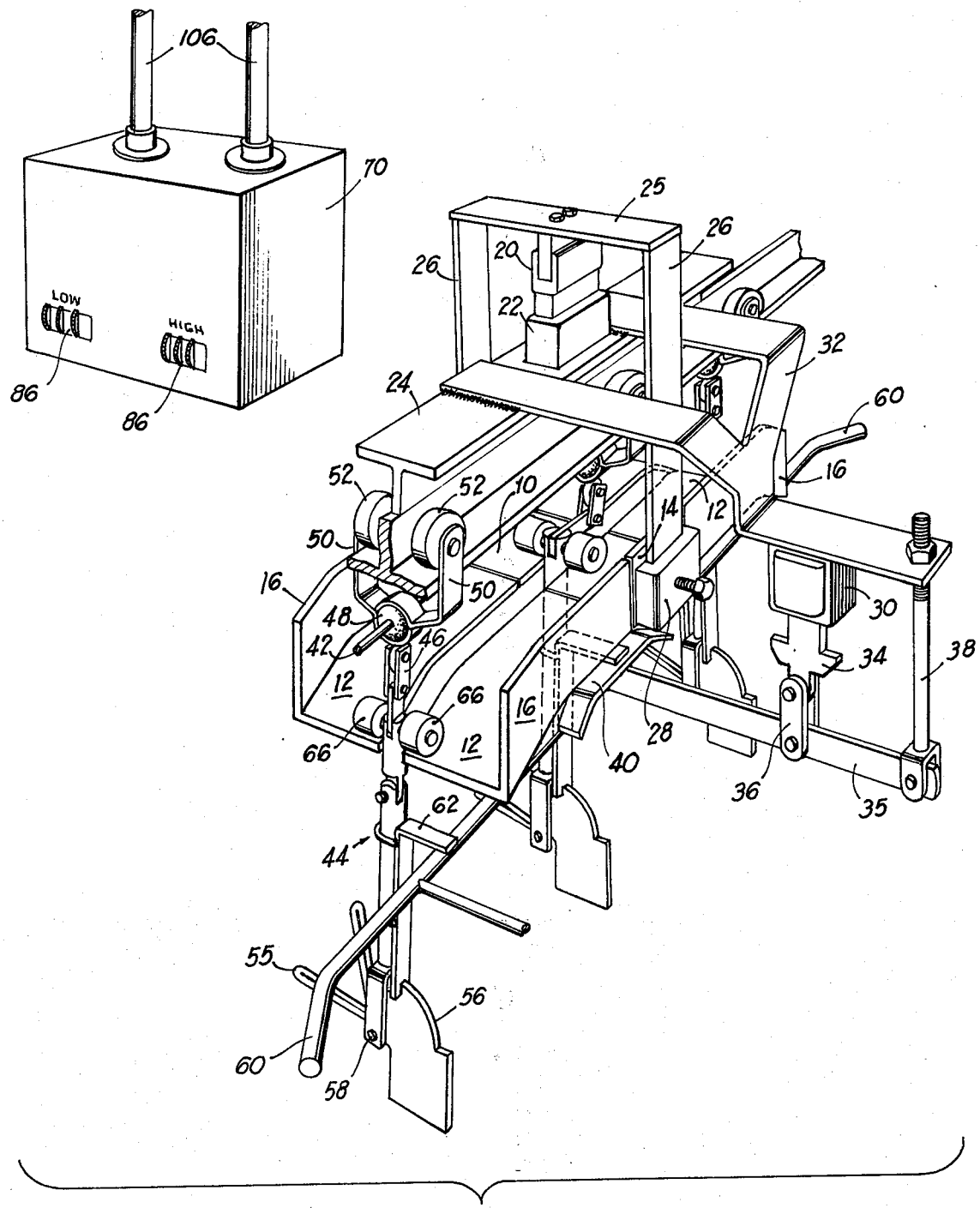
FIG. 1 is a perspective view of apparatus embodying principles of the present invention in one form.

Referring now in more detail to the drawing there is illustrated apparatus embodying principles of the present invention in one preferred form comprising a centrally split platform 10 mounted substantially coplanar between the flat portions of two centrally split ramps 12. Two opposing side walls 14 project upwardly from the platform in longitudinal alignment with two ramp side walls 16.

A load cell 20 is operatively mounted between a spacer 22 secured rigidly atop I-beam 24 and yoke 25. The yoke itself includes two upstanding arms 26 which are secured to platform sidewalls 14 through a platform height adjusting mechanism 28. A solenoid 30 is mounted to I-beam 24 by means of a bifurcated solenoid support 32. Solenoid 30 includes a plunger 34 which projects downwardly beneath the solenoid and solenoid support. Plunger 34 is coupled to a lever arm 35 by means of a link 36. One end of lever arm 35 is pivotally coupled to solenoid support 32 by means of a threaded rod 38. A trip bar 40 is secured atop the other end of a lever arm 35.

The just described apparatus provides a weighing and dispensing station disposed along a path defined by a conveyor line 42 from which a plurality of spaced shackles 44 are suspended by means of links 46. Each of the shackle suspension means includes a grommet 48 tightly secured about line 42 to which grommet a set of clamps 50 is attached. A pair of rollers 52 is rotatably mounted to clamps 50 which rollers movably support shackle 44 upon the track provided by I-beam 24. A pair of fork-shaped hock gripping elements 55 and a counterweight 56 are pivotally mounted to the bottom of shackle 44 by means of pivot pin 58 beneath shackle guide bar 60. An L-shaped shackle trip arm 62 is press-fitted within counterweight 56 with a laterally projecting portion disposed above trip lever 40. A second set of rollers 66 is rotatably mounted to an upper portion of shackle 44 to engage the inclined portion of ramp 12.

Figure 5:
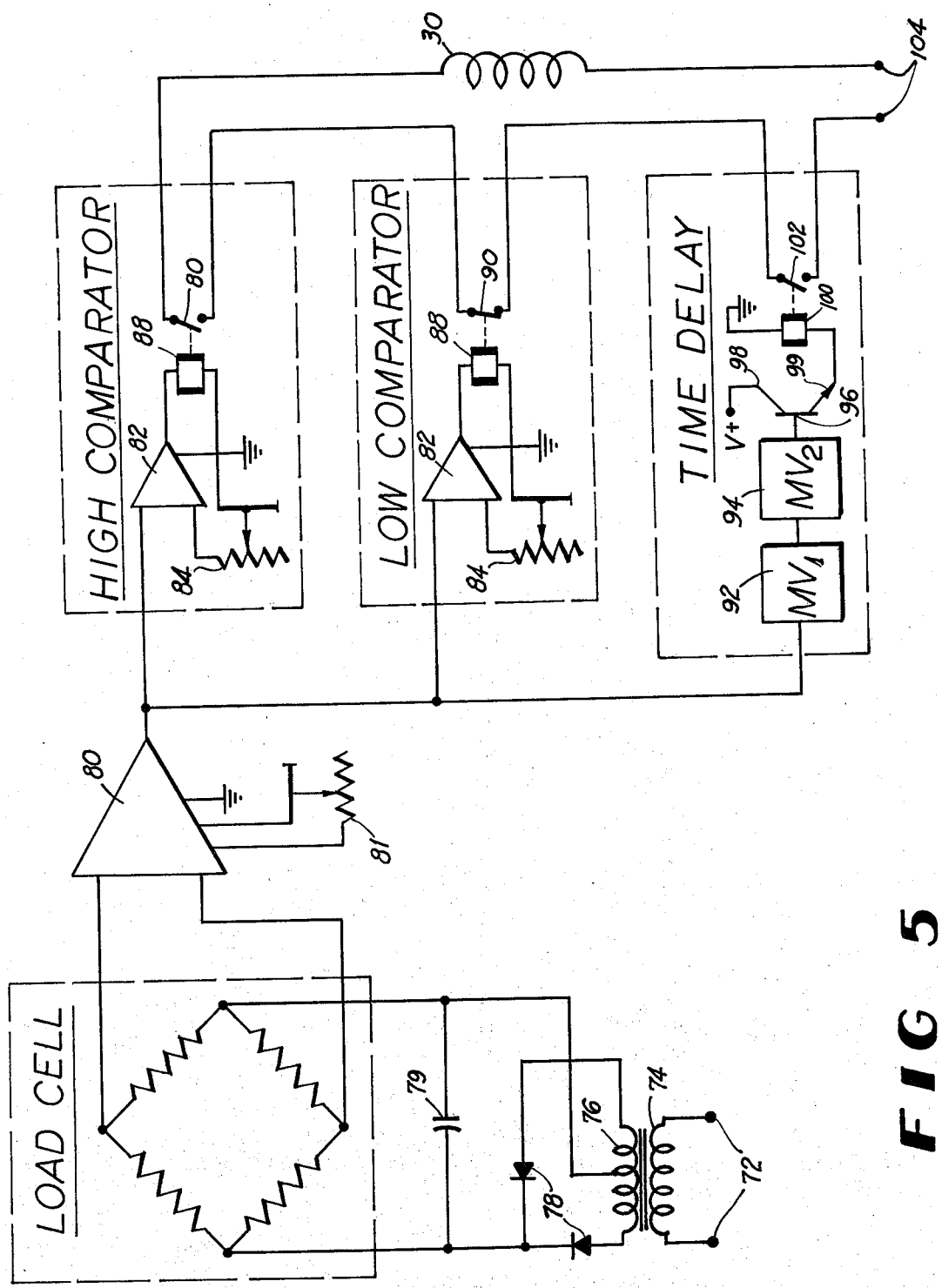
FIG. 5 is a circuit diagram of electronic components employed in the apparatus depicted in FIG. 1.

With reference now to FIG. 5 the apparatus is seen to also include electronic switching means coupled with load cell 20 and solenoid 30 which switching means is physically housed within the switch box 70 shown in FIG. 1. The switching means includes two terminals 72 adapted to be connected across a conventionally available 115 VAC power source. The terminals are connected across a primary winding 74 of a stepdown transformer having a secondary winding 76 across which 10 VAC is developed once terminals 72 are connected to the source of current. This AC voltage across the transformer secondary is converted to DC by fullwave rectification means including two diodes 78 and a filtering capacitor 79. The DC voltage is delivered to load cell 20 which may be provided by an Interface, Inc. load cell No. 1400 AJ-50. The output of the load cell is connected to an operational amplifier 80 such as a Precision Monolithics Company model number J7329.

The output of the operational amplifier is connected to a high weight limit comparator circuit, to a low weight limit comparator circuit, and to a time delay circuit. The high and low weight limit comparator circuits are similar save for reverse connection of their relays. Each of these circuits includes a 741 operational amplifier 82 connected to the output of amplifier 80, and a rheostat 84 coupled to amplifiers 82. The rheostats are manually adjustable by means of a set of dials 86 which protrude from the front of switch box 70 as shown in FIG. 1. Relays are connected to the outputs of amplifiers 82 which relays include solenoids 88 electromagnetically coupled with switches 89 and 90.

With continued reference to FIG. 5 the time delay circuit is seen to include two single shot multivibrators 92 and 94 connected in series circuit between amplifier 80 and gate 96 of a power transistor having a collector 98 connectable to the source of electric current. The transistor emitter 99 is connected to ground through a relay solenoid 100 which is operatively coupled with switch 102. Both switches 90 and 89 and switch 102 connect solenoid 30 in series circuit with terminals 104 which terminals are adapted to be connected across a 115 VAC source. Terminals 72 and 104 may, of course, be interconnected to extend through conduits 106 from switch box 70.

Figure 2:
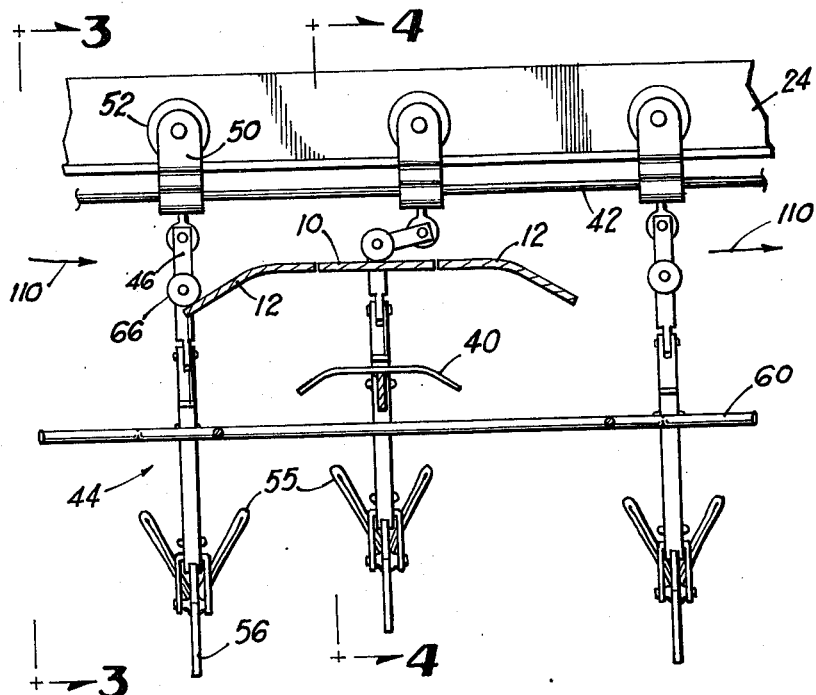
FIG. 2 is a side view in elevation of portions of the apparatus shown in FIG. 1.
Figures 3, 4:
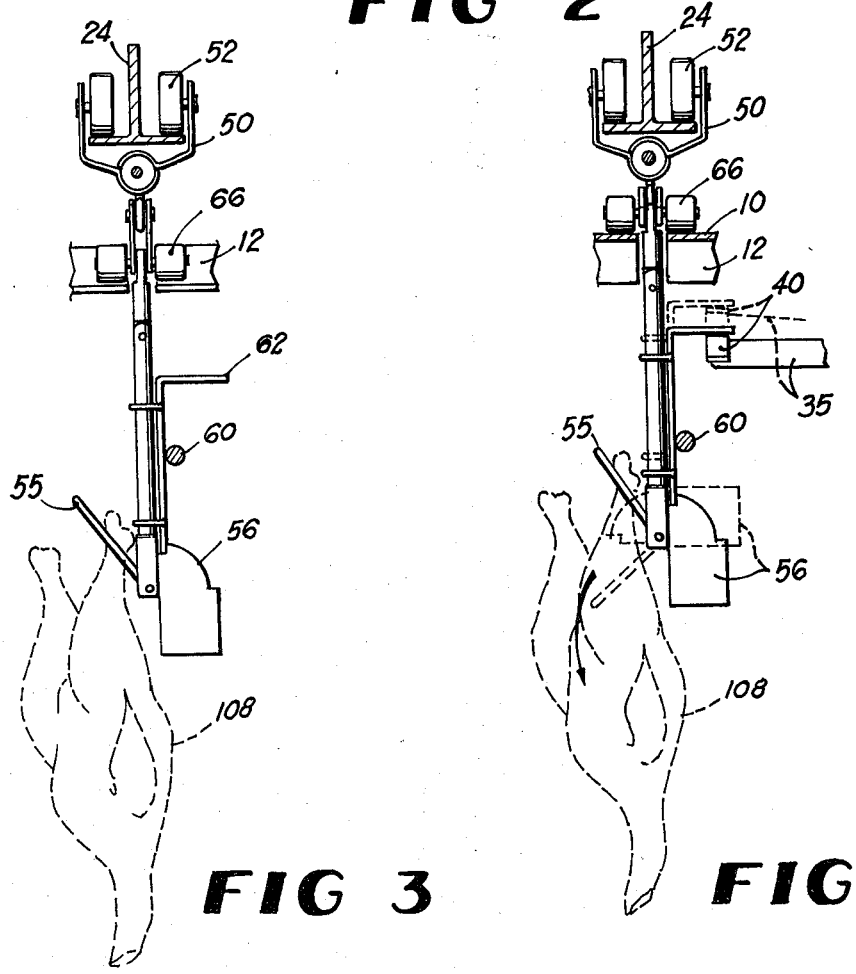
FIGS. 3 and 4 are end-on views taken along planes 3—3 and 4—4, respectively, illustrating an operative sequence of events in weighing and dispensing a chicken in a conveyor line system.

With reference now to FIGS. 2–4 an operative sequence of events may be visualized. As shackles 44 approach the weighing station in the direction indicated by arrows 110 supporting chickens 108, rollers 66 are seen to be brought into engagement with ramp 12. Continued movement of conveyor line 42 causes links 46 to pivot and thereby lift rollers 66 upwardly. This action causes most of the weight supported by rollers 66 upon the platform to be the tare weight provided by the shackle itself plus that of the bird suspended therefrom. Continued movement of the conveyor line causes rollers 66 to move onto platform 10. The shackle will then proceed for a finite period of time across the top surface of the platform 10 and then move onto the level portion of the exit ramp 12. Continued movement of the conveyor line causes rollers 66 to descend down the exit ramp and pivot back to a vertical orientation beneath the shackle suspension means.

In the event the weight of a bird supported upon the shackle falls within a preselected weight range the previously described electronic switching means circuitry causes solenoid 30 to become energized. Energization of the solenoid causes plunger 34 to rise thereby pivoting lever arm 35 and bringing trip bar 40 upwardly into engagement with shackle trip arm 62. The raising of trip arm 62 causes the hock tripping elements 55 to pivot downwardly to the position shown in dashed lines in FIG. 4 thereby permitting bird 108 to be released and fall into an unshown receptacle. Upon release of the bird from the hock gripping elements counterweight 56 causes the hock gripping elements 55 to return to their generally upright position as shown in FIG. 3.

With reference once again to FIG. 5 the manner in which the electronic switching means operates will now be described. Load cells, as is well known, in general terms comprise a resistance bridge one arm of which is sensitive to physical tension. Thus, when the force of weight is applied to one bridge arm as tension, an imbalance in bridge resistance occurs. With DC voltage coupled across the bridge an output voltage imbalance is consequently created which is amplified by amplifier 80. An adjustment 81 for offsetting the output of the amplifier is provided. This offset provides the means for zeroing or biasing the tare weight out. This adjustment allows the system to have a zero output with an unloaded shackle on platform 10. With the shackle loaded voltage is coupled with the high and low weight limit comparator circuits and to the time delay circuit.

Reference to the comparator and delay circuits shows that switches 89, 90 and 102 must all be closed in order for solenoid 30 to be coupled across terminals 104 and thereby energized to cause plunger 34 to rise and a bird 108 to be dispensed. The switches of the low comparator and time delay circuits are normally in an open position while that of the high comparator circuit is normally closed. Rheostats 84, which may be of value to provide up to 24,000 ohms resistance, are adjusted to set the selected weight limits. When a bird of some weight is positioned upon platform 10, solenoid 88 of the low comparator will cause switch 90 associated therewith to close, if the weight is higher than the low limit. In similar fashion the high comparator will cause switch 89 associated therewith to remain closed once a bird of some weight is supported by platform 10. The high comparator switch 89 will remain in closed position until a maximum point within the selected weight range is reached at which point it will open.

The time delay of circuit is employed to prevent the switching means from becoming operative until such time as rollers 66 have travelled atop platform 10 for an appreciable distance. The purpose of this is to prevent the switching means from reflecting transient weight conditions occasioned by the engagement of the rollers with the leading edge of the platform. Preferably, the circuit is not rendered operative until the rollers are positioned somewhere within the middle of the platform. The time delay circuitry itself is seen to comprise a first multivibrator 92 which, upon receiving a signal from amplifier 80, delivers a DC signal to a second multivibrator 94 for a finite period of time. Upon termination of the DC signal delivered by the first multivibrator to the second multivibrator a transient electronic bounce of opposite polarity is seen by the second multivibrator. This transient bounce causes the second multivibrator to become energized and to deliver to gate 96 of the transistor a pluse thereby gating the transistor which couples solenoid 100 to voltage source V+. This coupling of solenoid 100 to a voltage source causes switch 102 to close.

With time delay switch 102 closed the two comparator circuits may couple solenoid 30 across terminals 104. This will occur when a load weight falling within the prescribed range is detected as previously described. For example, should a bird weight range of between 2.0 and 3.0 pounds be selected and a bird falling within this range become positioned upon platform 10, switches 89 and 90 of the high and low comparator will be simultaneously closed. This is so because the high comparator does not detect a bird weight in excess of three pounds and the low comparator does not detect a bird weighing less than two pounds. Simultaneous closing of switchies 90 and 89 and time delay switch 102 serves to couple solenoid 30 across terminals 104 thereby energizing the solenoid. Once the solenoid is energized and the bird dispensed from the shackle the detected weight goes below minimum causing the low comparator switch 90 to open and de-energize solenoid 30.

It should, of course, be understood that the just described embodiment merely illustrates principles of the invention in one form. Many modifications may, of course, be made to the just described embodiment without departure from the spirit and scope of the invention as set forth in the following claims.

What is claimed is:

1. Apparatus for detecting and dispensing articles of preselected weight suspended from shackles movable along a path by a conveyor line, comprising:
   a platform for successively supporting the shackles at a weighing station disposed along the path;
   a load cell coupled with said platform to generate an electrical signal indicative of the weight of an article carried by a shackle supported upon said platform;
   switching means electrically coupled with said load cell and responsive to the magnitude of signals received from said load cell;
   a solenoid coupled with said switching means;
   trip lever means coupled with said solenoid to release an article from the shackle weighed on said platform upon actuation of said solenoid;
   and wherein said switching means includes a high weight limit comparator circuit including a switch in series circuit with said solenoid, switch actuation means, a manually adjustable rheostat, and a differential amplifier having input terminals coupled with said rheostat and with said load cell and an output terminal coupled with said switch actuation means.

2. Apparatus in accordance with claim 1 comprising a low weight limit comparator circuit including a second switch in series circuit with said solenoid, second switch actuation means, a manually adjustable second rheostat, and a second differential amplifier having input terminals coupled with said rheostat and with said load cell and an output terminal coupled with said switch actuation means.

3. Apparatus for detecting and dispensing articles of preselected weight suspended from shackles movable along a path by a conveyor line, comprising:
   a platform for successively supporting the shackles at a weighing station disposed along the path;
   a load cell coupled with said platform to generate an electrical signal indicative of the weight of an article carried by a shackle supported upon said platform;
   switching means electrically coupled with said load cell and responsive to the magnitude of signals received from said load cell;
   a solenoid coupled with said switching means;
   trip lever means coupled with said solenoid to release an article from the shackle weighed on said platform upon actuation of said solenoid;
   and wherein said switching means includes a time delay circuit comprising a switch in series circuit with said solenoid, switch actuation means, and two multivibrators coupling said switch actuation means with said load cell.

4. Apparatus for detecting and dispensing articles of preselected weight suspended from shackles movable along a path by a conveyor line, comprising:
   a platform successively supporting the shackles at a weighing station disposed along the path;
   a load cell coupled with said platform to generate an electrical signal indicative of the weight of an article carried by a shackle supported upon said platform;
   switching means electrically coupled with said load cell and responsive to the magnitude of signals received from said load cell;
   a solenoid coupled with said switching means;
   trip lever means coupled with said solenoid to release an article from the shackle weighed on said platform upon actuation of said solenoid;
   and wherein said switching means includes a set of switches in series circuits with said solenoid, a set of switch activating solenoids coupled with said load cell, first circuit means for causing one of said switch activating solenoids to open one of said switches in response to generation of an electrical signal by said load cell above a preselected maximum level, and second circuit means for causing another of said switch activating solenoids to open another of said switches in response to generation of an electrical signal by said load cell below a preselected minimum level.

5. Apparatus for detecting and dispensing articles of preselected weight suspended from shackles movable along a path by a conveyor line, comprising:
   a platform for successively supporting the shackles at a weighing station disposed along the path;
   a load cell coupled with said platform to generate an electrical signal indicative of the weight of an article carried by a shackle supported upon said platform;
   switching means electrically coupled with said load cell and responsive to the magnitude of signals received from said load cell;
   a solenoid coupled with said switching means;
   trip lever means coupled with said solenoid to release an article from the shackle weighed on said platform upon actuation of said solenoid;
   and wherein said switching means includes a set of switches in series circuits with said solenoid, a set of switch activating solenoids coupled with said load cell, and circuit means for causing one of said switch activating solenoids to maintain one of said switches open a preselected period of time following generation of an electrical signal by said load cell, and to maintain said one switch closed while said electrical signal continues to be generated following the elapse of said preselected period of time.

* * * * *